United States Patent [19]
Ysberg

[11] 3,911,875
[45] Oct. 14, 1975

[54] COOLED EXHAUST VALVE FOR AN INTERNAL COMBUSTION ENGINE

[75] Inventor: Bengt Ysberg, Paris, France

[73] Assignee: Societe d'Etudes de Machines Thermiques, Saint-Denis, France

[22] Filed: Jan. 17, 1974

[21] Appl. No.: 434,068

[30] Foreign Application Priority Data
Mar. 30, 1973  France.............................. 73.11656

[52] U.S. Cl. ...... 123/41.34; 123/41.41; 123/188 A; 123/188 AA
[51] Int. Cl.²........................................... F01P 1/06
[58] Field of Search...... 123/188 AA, 188 A, 41.34, 123/41.41

[56] References Cited
UNITED STATES PATENTS

| | | | |
|---|---|---|---|
| 2,048,707 | 11/1934 | Pfanstiehl..................... | 123/188 AA |
| 2,115,733 | 5/1938 | Krivobok ..................... | 123/188 AA |
| 2,135,966 | 11/1938 | Daisley......................... | 123/188 AA |
| 2,316,488 | 4/1943 | Roth ............................. | 123/188 AA |
| 2,396,552 | 3/1946 | Cape............................. | 123/188 AA |
| 2,431,853 | 12/1947 | Wischhusen ................. | 123/188 AA |
| 2,435,948 | 2/1948 | Wischhusen ................. | 123/188 AA |
| 2,627,259 | 2/1953 | Wood............................ | 123/188 AA |
| 2,664,874 | 1/1954 | Graham ........................ | 123/188 AA |
| 2,881,750 | 4/1959 | Hanink......................... | 123/188 AA |

FOREIGN PATENTS OR APPLICATIONS

| | | | |
|---|---|---|---|
| 13,791 | 4/1909 | United Kingdom............. | 123/188 A |

*Primary Examiner*—Charles J. Myhre
*Assistant Examiner*—Daniel J. O'Connor
*Attorney, Agent, or Firm*—Kenyon & Kenyon Reilly Carr & Chapin

[57] ABSTRACT

An exhaust valve for an internal combustion engine that is cooled by circulation of cooling fluid such as water in internal conduits of the valve rod and valve head is described. The valve rod of this head is protected from chemical corrosion in the region thereof whose temperature in operation corresponds to the dew point. Thus, the exhaust gases can combine with water vapor to provide a corrosive chemical that corrosively attacks the usual metal of the valve rod in said region. To avoid this corrosion an externally located outer coating that is a metal alloy resistant to the chemical corroding action is applied to the surface of the valve rod in and about said region. In order to provide smooth unbroken continuity in external diameter of the valve rod in its adjoining alloy coated and uncoated portions the diameter of the valve rod in said region is reduced by an amount sufficient to accommodate the thickness of the applied alloy coating. This alloy may comprise carbon chromium, molybdenum, tungsten, iron, cobalt and nickel - or simply tungsten carbide with cobalt.

1 Claim, 1 Drawing Figure

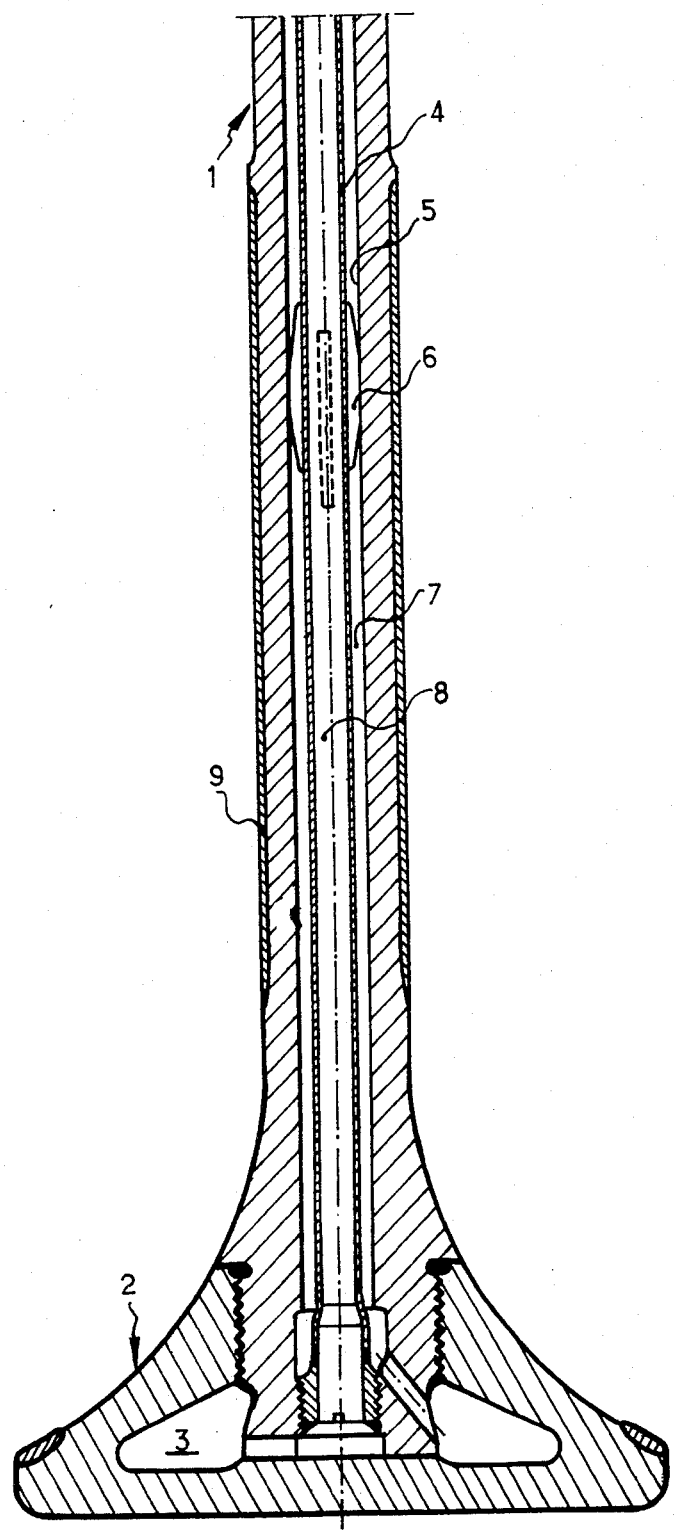

COOLED EXHAUST VALVE FOR AN INTERNAL COMBUSTION ENGINE

The present invention relates essentially to an exhaust valve for an internal combustion engine, of the type cooled by circulation of a cooling fluid in internal channels of the valve rod and in internal chambers of the valve head, and the valve rod of which is protected from corrosion by exhaust gas leaks.

Indeed, in certain internal combustion engines and more particularly in large-size Diesel engines, the exhaust valves are cooled by circulation of a liquid such as water in the valve rod and head. In particular, in Diesel engines working on heavy oil containing sulphur, the exhaust or burnt gases contain sulphuric anhydride and water vapour. These gases tend to rise along the valve rods in the passageway formed between the latter and the body forming a valve guide and reach a point of the rod where the temperature is close to the dew point owing to the forced cooling of the valve. This results in a chemical combination of the sulphuric anhydride with the water vapour and the formation of sulphuric acid which acts chemically upon the valve rod in the region of the said temperature close to the dew point.

In order to avoid this drawback, it has already been proposed in the prior art to provide sealing means about the valve rod so as to prevent or at least reduce the passage of the exhaust gases along the valve rod. These protecting devices are generally complicated and must ensure an almost perfect sealing, and this gives rise to technological problems. It has also been attempted to provide the valve rod with a protecting coating. But such coatings have not been satisfactory, for either they poorly withstand chemical corrosion or poorly adhere to the metal substrate owing to chemical corrosion of the interface through the porous external surface.

In order to avoid these drawbacks, the present invention provides an exhaust valve for an internal combustion engine, of the aforesaid cooled type, which is characterized in that the valve rod comprises, on a portion of its cylindrical surface in proximity to the valve head and more particularly in the region where the temperature of the external surface of the valve rod in operation corresponds substantially to the temperature of at least partial condensation or dew point of the gaseous medium surrounding the valve rod, a protecting coating based on a metal alloy withstanding chemical corrosion, so arranged as to form a smooth cylindrical surface, preferably without apparent discontinuity with the portion of the valve rod connecting it to the valve head.

According to another feature of the invention, the said protecting coating is a metal alloy comprising 0.08 % carbon, 12 % chromium, 15 % molybdenum, 3 % tungsten, 5 % iron, 2.5 % cobalt, 62.42 % nickel.

According to still another feature of the invention, the protecting coating is composed of 87 % tungsten carbide and 13 % cobalt.

By so arranging a suitable protecting coating capable of withstanding chemical corrosion at a quite definite point of the valve rod, the invention enables the problems of the prior art to be solved in a quite simple manner and the valve rod to be protected with a particularly high degree of efficiency against corrosion by the exhaust gases.

The invention will be better understood and other purposes, features, details and advantages of the latter will appear as the following explanatory description proceeds with reference to the appended diagrammatic drawing given solely by way of example illustrating one form of embodiment of the invention and wherein:

the single FIGURE is a partial, longitudinal sectional view of a cooled valve rod provided with a protecting coating according to the invention.

The valve rod shown partially in axial longitudinal section is secured to a valve head 2 comprising an internal cooling chamber 3. In the case considered, the valve rod 1 comprises an internal cylindrical tubular duct 4 extending in an axial channel 5 of the rod, with a distance piece 6 interposed therebetween. The duct 4 and the channel 5 define coaxial channels 7 and 8, respectively, through which the cooling liquid is supplied into and discharged from the chamber 3 of the valve head.

In order to avoid the corrosion of the valve rod by the exhaust gases, a protecting coating 9 based on a metal alloy withstanding corrosion is arranged on a portion of the external cylindrical surface of the rod 1 so as to overlay in particular the region of the external surface of the valve rod, the temperature of which, during operation, corresponds substantially to the condensation temperature or the dew point of the combustion gases, including sulphuric anhydride and water vapour, which rise along the valve rod. The said protecting coating is a metal alloy having one of the aforementioned compositions. It is advantageously applied in the molten state, for example by a known method of thermal projection on the said portion of the valve rod, which has an external diameter slightly smaller than that of the rest of the valve rod, so that the protecting coating arranged at the appropriate location of the external surface of the valve rod, preferably forms with the latter a smooth surface without apparent discontinuity.

Of course, the invention is by no means limited to the form of embodiment described and illustrated, which has been given by way of example only. In particular, it comprises all the means constituting technical equivalents to the means described as well as their combinations, should the latter be carried out according to the spirit of the invention.

What is claimed is:

1. An internal combustion engine exhaust valve comprising a valve head, a valve rod having a cylindrical surface, internal channels in the valve rod and an internal chamber in the valve head for the circulation of a cooling fluid, said valve rod having a reduced external diameter on a portion of its cylindrical surface in proximity to the valve head and in particular in the region where the temperature of the external surface of the valve rod during operation corresponds substantially to the temperature of at least partial condensation or dew point of exhaust gases surrounding the valve rod, and a protecting coating withstanding chemical corrosion by at least a partially condensed portion of said exhaust gases and so disposed in said region as to form a smooth cylindrical surface without discontinuity with that portion of the valve rod connecting it to the valve head, said protecting coating being a metal alloy selected from the group consisting of a metal alloy comprising 0.08% carbon, 12% chromium, 15% molybdenum, 3% tungsten, 5% iron, 2.5% cobalt and 62.42% nickel, and of an alloy comprising 87% tungsten carbid and 13% cobalt.

* * * * *